(12) United States Patent
Niles

(10) Patent No.: US 7,834,269 B2
(45) Date of Patent: Nov. 16, 2010

(54) PROTECTION OF ELECTRICAL POWER TRANSMISSION SYSTEMS

(76) Inventor: Martin S. Niles, P.O. Box 1087, Lac La Biche, Alberta (CA) T0A 2C0

( * ) Notice: Subject to any disclaimer, the term of this patent is extended or adjusted under 35 U.S.C. 154(b) by 0 days.

(21) Appl. No.: 11/469,465

(22) Filed: Aug. 31, 2006

(65) Prior Publication Data

US 2008/0123254 A1    May 29, 2008

(51) Int. Cl.
*H02G 15/08* (2006.01)
(52) U.S. Cl. .................................................. 174/84 R
(58) Field of Classification Search ............. 174/40 R, 174/41, 42, 43, 45 R, 46, 84 R
See application file for complete search history.

(56) References Cited

U.S. PATENT DOCUMENTS

| | | | |
|---|---|---|---|
| 2,871,282 A * | 1/1959 | Tipsord et al. | 174/5 R |
| 3,657,723 A * | 4/1972 | Rys | 200/237 |
| 3,835,238 A * | 9/1974 | West | 174/5 R |
| 4,095,404 A | 6/1978 | Babayan | |
| 4,174,678 A | 11/1979 | Van Den Bergh | |
| 4,234,753 A * | 11/1980 | Clutter | 174/5 R |
| 4,269,008 A | 5/1981 | Assouline | |
| 4,479,990 A | 10/1984 | Dixon et al. | |
| 4,628,145 A * | 12/1986 | Kolcio et al. | 174/5 R |
| 4,693,889 A | 9/1987 | Chirchirillo et al. | |
| 4,845,307 A * | 7/1989 | Cumming et al. | 174/5 R |
| 4,873,082 A | 10/1989 | Cacioli et al. | |
| 4,943,448 A | 7/1990 | Lacourciere | |
| 4,963,819 A | 10/1990 | Clarke et al. | |
| 4,973,370 A | 11/1990 | Kreiberg | |
| 5,058,335 A | 10/1991 | Richter | |
| 5,153,383 A * | 10/1992 | Whited et al. | 174/135 |
| 5,153,385 A | 10/1992 | Juskey et al. | |
| 5,196,451 A | 3/1993 | Greig-Smith et al. | |
| 5,255,896 A | 10/1993 | Letarte et al. | |
| 5,296,226 A | 3/1994 | Askham | |
| D359,099 S | 6/1995 | Sugimoto | |

(Continued)

FOREIGN PATENT DOCUMENTS

FR         2167275         8/1973

(Continued)

OTHER PUBLICATIONS

Material data sheet for CARBOGLAS 1601 SG—Glass Flake Polyester, as provided by Carbonline, Oct. 2000.

(Continued)

*Primary Examiner*—William H Mayo, III
(74) *Attorney, Agent, or Firm*—Anthony R. Lambert

(57) ABSTRACT

A method and apparatus for protecting electrical power transmissions systems that may or may not be energized. A protector and method for protecting a component of an electrical power transmission system. A dielectric cover is molded to fit around the component. The dielectric cover has a peripheral edge including portions with cooperating mating surfaces that, in use, mate together to secure the dielectric cover on the component. A grip portion, for example the mating surfaces, of the dielectric cover is preferably shaped to receive a hot stick. The dielectric cover may be provided with ventilation openings, and a friction enhancing interior surface, such as a weak adhesive on an interior surface of the dielectric cover.

27 Claims, 7 Drawing Sheets

U.S. PATENT DOCUMENTS

| | | | |
|---|---|---|---|
| 5,433,029 A | 7/1995 | Donoho et al. | |
| 5,485,307 A | 1/1996 | Kim | |
| 5,519,080 A | 5/1996 | Matsushita et al. | |
| 5,549,902 A | 8/1996 | Preiser et al. | |
| 5,599,374 A | 2/1997 | Detrick | |
| 5,691,407 A | 11/1997 | Azechi et al. | |
| 5,864,096 A | 1/1999 | Williams et al. | |
| 5,873,324 A * | 2/1999 | Kaddas et al. | 119/174 |
| 5,997,894 A | 12/1999 | Blum et al. | |
| 6,005,196 A * | 12/1999 | Spillyards | 174/138 F |
| 6,006,698 A | 12/1999 | Negre | |
| 6,226,933 B1 | 5/2001 | Nelson et al. | |
| 6,248,956 B1 | 6/2001 | Cook et al. | |
| 6,251,990 B1 | 6/2001 | Meguriya et al. | |
| 6,303,870 B1 * | 10/2001 | Nazaryan et al. | 174/172 |
| 6,878,883 B1 * | 4/2005 | Rauckman | 174/135 |
| 6,995,313 B1 * | 2/2006 | Barnett et al. | 174/5 R |
| 7,009,102 B2 * | 3/2006 | Milner | 174/5 R |
| 7,154,034 B2 | 12/2006 | Lynch | |
| 7,244,470 B2 | 7/2007 | Niles | |
| 2003/0010528 A1 | 1/2003 | Niles | |
| 2004/0265497 A1 | 12/2004 | Niles et al. | |

FOREIGN PATENT DOCUMENTS

| | | | |
|---|---|---|---|
| JP | 06-049409 A | * | 2/1994 |
| JP | 8090630 | | 4/1996 |
| JP | 2000059963 | | 2/2000 |
| JP | 2001078322 | | 3/2001 |
| WO | 03007448 | | 1/2003 |

OTHER PUBLICATIONS

"Midsun Products—Squirrel, Raccoon, Birds, Snake outage protection", Midsun Group, inc. [online], Apr. 2006, http://www.midsungroup.com, Southington, USA.

"BCIC-8D-18", Tyco Electronics [online], Apr. 2006, http://energy.tycoelectronics.com, Ottobrunn, Germany.

"BCIC-5D-6", Tyco Electronics [online], Apr. 2006, http://energy.tycoelectronics.com, Ottobrunn, Germany.

"BCIC-10D-18", Tyco Electronics [online], Apr. 2006, http://energy.tycoelectronics.com, Ottobrunn, Germany.

"BCIC-4411", Tyco Electronics [online], Apr. 2006, http://energy.tycoelectronics.com, Ottobrunn, Germany.

"BCIC-8D-14-01", Tyco Electronics [online], Apr. 2006, http://energy.tycoelectronics.com, Ottobrunn, Germany.

* cited by examiner

PROTECTION OF ELECTRICAL POWER TRANSMISSION SYSTEMS

BACKGROUND

The apparatus and method disclosed here relate to the field of electrical power transmission and distribution and the need to insulate electrical power systems from short circuits caused by birds and other animals. Long-distance electricity transmission is typically carried with high voltage conductors. Higher voltages reduce resistance power loss, and line voltage for long distance lines is stepped up with generating stations at selected locations. Transmission lines traverse large regions and require numerous support towers. The conductors in high tension powerlines are typically uninsulated because of the cost and additional weight of insulated versus uninsulated conductors.

Electric poles, towers, including substations provide attractive roosts for birds, particularly in treeless regions. If the wings of a bird simultaneously contact a conductor and another object such as an adjacent conductor, support tower or tree, the resulting electrical short-circuit can kill the bird and also damage the power system. The electrical short can further cause electrical system damage resulting in power outages. Because large (and typically protected) birds are more susceptible to such incidental contact, electrocution hazards disproportionately affect large bird species such as raptors.

In particular, substations transform power from transmission voltages to distribution voltages (typically ranging from 2400 volts to 37,500 volts. Distribution voltages allow for reduced system clearances. These reduced clearances between Phase to ground and phase to phase, increase station susceptibility to bird or animal caused outages. During animal or bird caused fault conditions, close in faults often trigger sensitive relay protection schemes resulting in Substation lockouts interupting service to thousands or possibly tens of thousands of customers and at the same time damaging expensive substation equipment.

The variety and number of proposed solutions for repelling birds and other animals from electrocution risks highlights the persistence and magnitude of the problems created by such undesirable intrusion. Many different types of scarecrows and other moving devices have been developed to repel birds. In addition to moving devices, various physical structures have been developed to discourage birds from roosting on structures, particularly involving spikes or other physical barriers. Other bird repelling concepts use electricity or magnetics to discourage bird intrusion. Shield and cage devices have been specifically designed to restrict birds and other animals from short-circuiting electrical leads, such as U.S. Pat. Nos. 5,153,383 and 5,485,307.

The inventor's own prior patent application discloses a method of in situ application of a dielectric coating to live power transmission components, see United States publication no. 20040265497. The variety and number of these efforts indicate significant problems in the exclusion of birds from undesirable areas, and the inherent difficulties in effectively accomplishing such exclusion. Many of these techniques are expensive to employ and are ineffective in preventing birds from landing in a particular spot. While the inventor's own prior patent application supplies a solution for many applications, there remains a need for an improved method and apparatus capable of resisting electrical wire short circuits deleterious to birds and other animals.

SUMMARY

There is therefore provided a method and apparatus for protecting electrical power transmissions systems including substations, for example that conduct voltages in the range of 10 KV to 60 KV, from damage.

Accordingly, there is provided a protector for a component of an electrical power transmission system, the protector comprising a dielectric cover spray molded to fit around the component; and the dielectric cover having a peripheral edge including portions with surfaces that, in use, secure the dielectric cover on the component.

There is also provided a method of protecting a component of an electrical power transmission system from damage, the method comprising the steps of spray molding a dielectric cover to have a shape that fits around the component, placing the dielectric cover over the component, even while the electrical power transmission system is carrying current; and securing the dielectric cover on the component. Securing the dielectric cover on the component may comprise securing together cooperating surfaces of peripheral edges of the dielectric cover.

BRIEF DESCRIPTION OF THE DRAWINGS

There will now be given a brief description of embodiments of an apparatus and method for protecting a power transmission system, with reference to the drawings, by way of illustration only and not limiting the scope of the claims, in which like numerals refer to like elements, and in which:

DESCRIPTION

In the claims, the word "comprising" is used in its inclusive sense and does not exclude other elements being present. The indefinite article "a" before a claim feature does not exclude more than one of the feature being present. What is disclosed provides a unique method and apparatus for resisting electrical shorts on high voltage power systems between phase to phase and phase to ground including structure and conductor (s) and all related components.

Figure 1:
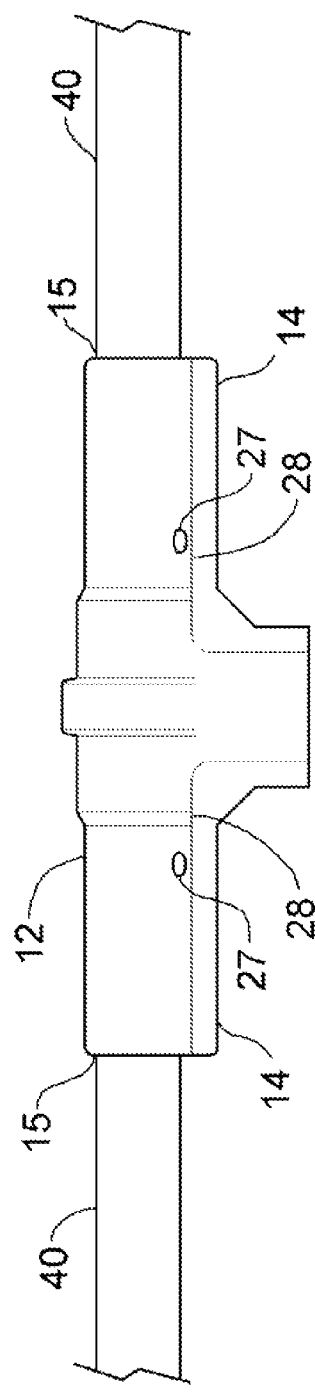
FIG. 1 is a side view of an embodiment of a protection apparatus.
Figure 2:
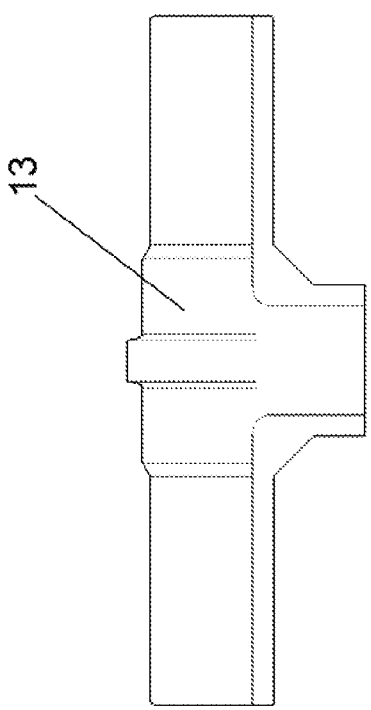
FIG. 2 shows a mold approximating the shape of a power system component.
Figure 3:
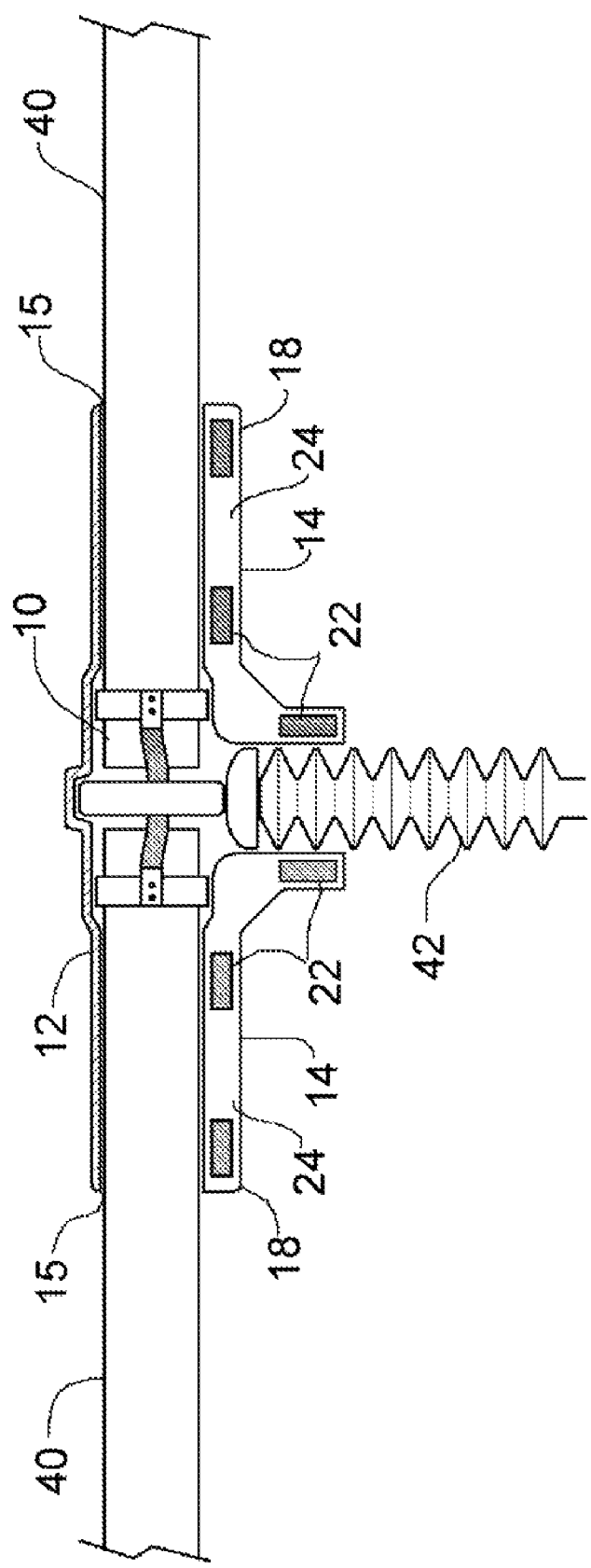
FIG. 3 is a side view, broken away, of the embodiment of FIG. 1.
Figure 4:
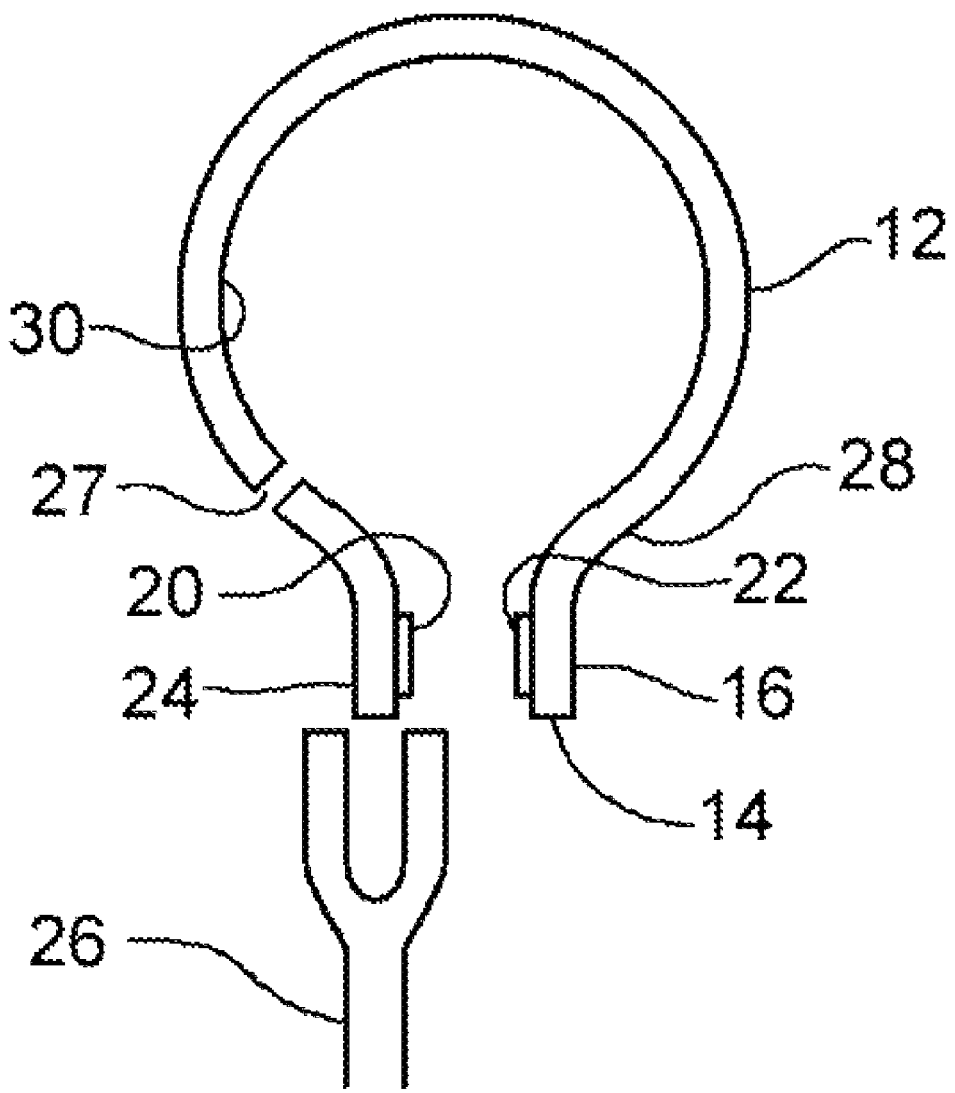
FIG. 4 is a cross-section of the embodiment of FIG. 1 showing a hot stick.

A protector for a component 10 of an electrical power transmission system is formed of a dielectric cover 12 spray molded to fit around the component as shown in FIGS. 1-3. The component 10 shown in FIG. 3 is in this instance a sliding bus. The mold used for the cover may be a structure having the approximate shape of the component, or may be an exact copy of the component, or may be designed based solely on the general dimensions of the component. The dimensions of the component may be obtained from manufactors' specifications or a digitally scanned dimensional image converted into a blueprint mold. An exemplary mold 13 is shown in FIG. 2. In some embodiments, the mold need not have the exact shape of the component. However, a loose fit may not be desirable in some embodiments. Components of the electrical power transmission system may refer to any part of the system, including support structures, transmission media, joints, cross-arms, isolators, connectors, transformers, potential transformers, current transformers, switches, gang operated switches, brackets, transformer bushings, reclosing devices, bus supports, wire supports, lightning arrestors, bus work, conductors, wire attachments, expansion joints, gas detector piping, underground terminations, webbed support steel, disconnects, bolted connections, compression connections, bus splice, switch drives, capacitors or other items known in the art.

A mold release compound may be applied to the mold 13 before application of resin that will cure to form the cover 12. The material that will form the cover is sprayed onto the mold with a suitable liquid composition ("resin") that cures rapidly and forms a dielectric upon curing. The resin is preferably sprayed onto the mold in several layers to build a coating whose thickness is dependent upon the intended application, as for example $\frac{1}{8}^{th}$ to $\frac{1}{2}$ an inch thick. With a fast set elastomer used as the resin, the resin begins setting as it exits the applicator and cures rapidly upon impact with the mold, allowing a continuous build up of coating thickness. An example of a suitable resin is a two part resin composition such as a polyurethane/polyurea hybrid material. A polyurethane may be formed by reacting an isocyanate terminated resin material with a resin material containing reactive hydroxyl sites. A polyurea may be formed by reacting an isocyanate terminated resin with a resin material containing reactive amine sites. Polyurea generally has a more rapid cure time, higher temperature resistance, and a higher cost than polyurethane. The cover 12 may be formed from a polyurethane/polyurea hybrid material. It is applied in a liquid state to the mold and polymerizes in about 30 seconds, depending on conditions, to produce a tough elastic cover. The product provides excellent insulation in both the liquid and solid state.

A suitable applicator for a fast set two component elastomer will mix the components immediately before the mixture exits the applicator, for example as shown in United States publication no. 2004/-265,497 published Dec. 30, 2004.

The dielectric cover may be modified with fire resistant, self extinguishing, rodent repelling fluorescent pigment for added visibility and safety marketing on overhead power lines in work areas. It can also be formulated with phosphorescent pigments to provide visibility during the night. An example of a suitable two part resin is Greenjacket™ 100% solids high performance polyurethane/polyurea elastomer. Greenjacket™ elastomer is designed to provide electrical insulation in a wide variety of industrial applications where toughness and abrasion resistance are required, and is resistant to water and a wide variety of chemicals. Greenjacket™ is a fast set system intended for use with plural component spray equipment with a mix ratio of 1 to 1. The following are some properties of the resin:

| | |
|---|---|
| Density | 1.10 g/mL |
| Service Temp. | −50 □C. to 250 □C. |
| Shore hardness | 45D/97A |
| Elongation | 170% |
| Tensile Strength | 2300 psi |
| Dielectric Strength | 40 KV/125 mils |
| (After 1000 hours QUV) | |
| Elongation | 110% |
| Tensile Strength | 1600 psi |

Figure 5:
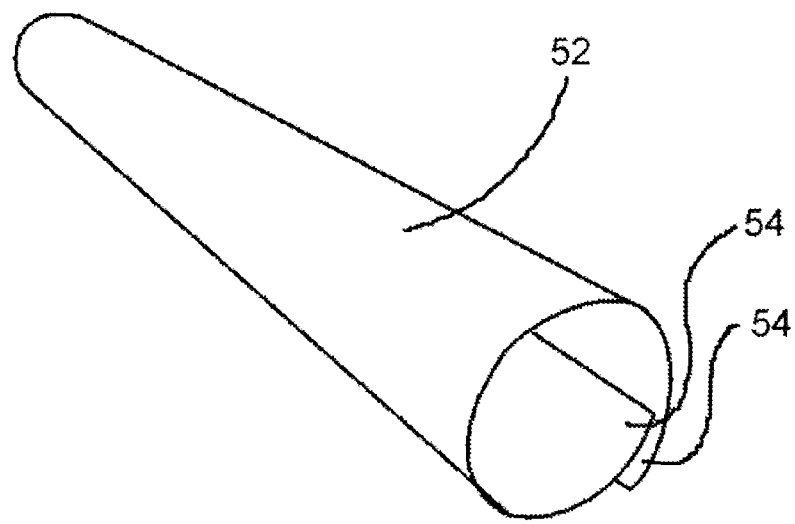
FIGS. 5-11 illustrate several examples of protective covers.

The dielectric cover 12 has a peripheral edge 14 including portions 16, 18 with surfaces 20, 22 that, in use, secure the dielectric cover 12 on the component 10. The surfaces 20, 22 may be respectively hook and loop portions of Velcro™ strips, but other fastening systems may be used, such as tongue and groove arrangements, other press-fit devices, ties passing through openings (eg FIG. 6), dielectric pins, brackets, cords and straps, or overlapping edges (FIG. 5). The peripheral edge 14 runs around the dielectric cover 12. In areas where the edge 14 surrounds a component 10 such as a conductor 40, the edge 14 should come close to, but need not touch the component 10. A small gap 15 between the edge 14 and component 10 may be provided for ventilation purposes and to allow ease of fitting the dielectric cover 12 on the component 10. On the other hand, the dielectric cover 12 may be allowed to press fit onto the component 10 in cases where ventilation is not necessary or ratings permit. In the area of the surfaces 20, 22, opposed edges of the dielectric cover 12 meet to hold the cover 12 on the component 10. The internal surface of the dielectric cover may be provided with ribs for structural support and to help maintain a ventilation space between the component and the cover.

The dielectric cover 12 may have a grip portion 24 shaped to receive a hot stick 26 (FIG. 3), although many hot sticks will be able to attach to various places on the cover 12. In the example shown, the surfaces 20, 22 are shaped to form the grip portion 24. The dielectric cover 12 may be provided with ventilation openings 27. The dielectric cover 12 may alter the rating of the component. It is desired to reduce the rating effect, and therefore openings may be provided as for example along an underside 28 of the dielectric cover 12 if required to reduce the rating. The openings should not be so large so as to allow small animals or birds to enter the dielectric cover 12, and may be covered with a mesh to prevent entry of living creatures into the dielectric cover 12.

The dielectric cover 12 may have a friction enhancing interior surface 30. Since the dielectric cover 12 may be considerably larger than the component 10 to which it is applied, some method of preventing movement of the dielectric cover 12 may be desirable in those cases. This might be provided for example by the shape of the dielectric cover 12, interior projections, or a weak adhesive applied to an interior surface of the dielectric cover 12.

The dielectric cover 12 is attached to selected components, that are selected based on the anticipated size and reach of birds and other animals potentially in contact with electrified components of the power transmission system.

A dielectric is any material suitable for providing insulating capability between electrified components and an electrical ground. Specifically, such insulating strength should be sufficiently great to resist short circuits when a bird or other animal contacts for example a conductor 40 and an electrical ground such as support 42. The insulating strength of dielectric cover 12 can be selected based on several factors including the voltage potential between conductor 40 and support 42, the type and nature of birds and animals potentially in contact therebetween, and parameters regarding the electrical conductive contact between birds and animals within potential electric short circuits. For example, parameters useful to such evaluation include the type of contact between feathered wings and conductors 40 versus the gripping strength of raptor talons in contact with support 42. Such contact in dry versus humid or wet conditions also affects the amount of insulating capability desired. Such insulating capability also depends upon the selected objectives.

The dielectric material used for the dielectric cover can comprise a single part material or multiple part material mixed before application, and can be formulated from a combination of liquid and semi-solid or solid components. An electrical power transmission system may refer to any apparatus intended to transmit power. While the disclosure is generally directed toward high voltage transmission systems such as those transmitting AC current between 10 KV and 60 KV, it will be understood that the teachings equally apply and may be adapted any suitable voltage range or any suitable transmission system.

The dielectric material used for cover 12 should be resistant to deterioration induced by ultraviolet light, rain, hail, thermal temperature variations, and other environmental factors.

The dielectric cover may be placed over selected portions of conductors 40 at locations close to support 42. Because conductors 40 comprise one side of the electrical contacts necessary to create a short circuit when bridged by a bird or other animal, protection of such conductors 40 further reduces the risk of short circuits.

One significant benefit of the disclosed method and apparatus is the flexibility and portability of the composition and installation equipment in retrofitting existing supports 42 or conductors 40. Regions having bird related failures or potential for failures can be identified and targeted for application of the disclosed method and apparatus to existing powerline and other facilities. The disclosed method and apparatus accomplishes the objectives of protecting animals and reducing equipment failure while avoiding the prohibitive costs of replacing existing conductors and conductor supports. The disclosed method and apparatus further provides significant flexibility in application to conductors and support structures having different shapes and orientations.

As the potential voltages can be around 15 KV, but typically 10 to 40 KV, the dielectric cover must have a suitable thickness, for example approximately ⅛ inch, to achieve suitable protection. A suitable dielectric must have good flexibility and elongation to accommodate thermal expansion and typical wind caused movement expected from suspended conductors.

The disclosed method and apparatus as described provides a method for protecting energized overhead high-voltage power lines and associated equipment from damage, increasing power system reliability, and protecting against accidental electrocution death of birds and other animals including endangered species, by applying a cover of electrical insulation to selected target areas of the power system that previously did not have electrical insulation.

Method steps for protecting a component of an electrical power transmission system from damage include spray molding a dielectric cover to have a shape that fits around the component; placing the dielectric cover over the component while the electrical power transmission system is in operation; and securing the dielectric cover on the component. A lineman will typically use a hotstick to grip the dielectric cover 12, for example on the mating edges 20, 22, lift the dielectric cover 12 over the component 10, drop it down onto the component 10, pulling the dielectric cover 12 onto the component 10, and then secure the mating edges 20, 22 together to secure the dielectric cover 12 on the component 10.

Other steps that may be taken include initial steps of risk assessment (that is, identification of what risks are associated with a particular piece of equipment and target identification (that is, identifying what structure to protect such as grounded structure or equipment that becomes energized). For determining the shape of the cover, three dimensional scanning may be used to create a digital image of a component, followed by the conversion of digital imagery to a mold blueprint and manufacture of a mold (which could be made of aluminum or other suitable materials). Once the mold is made, mold releasing agent (adhesion prevention agent) is applied to the mold. Next step is to apply fast set polymer to mold to a predetermined thickness (usually 125 mils, but is voltage dependent), followed by curing of fast set polymer, and demolding of dielectric polymer cover (removal from mold). After the cover is taken off the mold, it is inspected for thin spots, imperfections, air pockets, and damage from demolding process. Next, mold release residue is removed from the cover, and the cover undergoes final curing on a suitable rack. The cover may need to retain desired shape for a couple hours before being packaged otherwise it may be misshapen. The cover is then packaged and shipped, and then installed at the customer premises by placing the cover on the electrical component, such as by using a hot stick.

The dielectric cover 12 may have a peripheral edge 14 that surrounds a portion of the component 10, such as a conductor. The dielectric cover 12 is preferably placed over the component 10. In some embodiments, the peripheral edge 14 is spaced from the component 10 by no more than for example about 1 cm to aid in preventing living creatures from entering the dielectric cover 12.

To install the dielectric cover 12 on a component 10, a lineman is positioned near the work area which can be on the utility structure, in a truck boom bucket, other aerial device or work platform. The lineman must maintain a safe distance from the energized components that complies with typical utility hotstick live line work practices (safe limit of approach as required by governing body) and where the lineman may be at ground potential. The lineman 70 uses hotstick live line work practices to manipulate the dielectric cover 12.

For safety purposes, the lineman should be positioned such that he is insulated from ground and is at high impedance from both ground and the energized components, such as in an insulated aerial device such as a bucket on an insulated truck boom, or similar insulated work platform. Alternatively, the lineman may use rubber glove live line work practices instead of hotstick live line work practices, thus enabling the lineman to work within arm's length distance of energized components.

A spray molding system allows cost effective tailoring of the cover thickness, as well as cost effective design of molds so that molds for hundreds of different types of components may be made economically.

Figure 6:
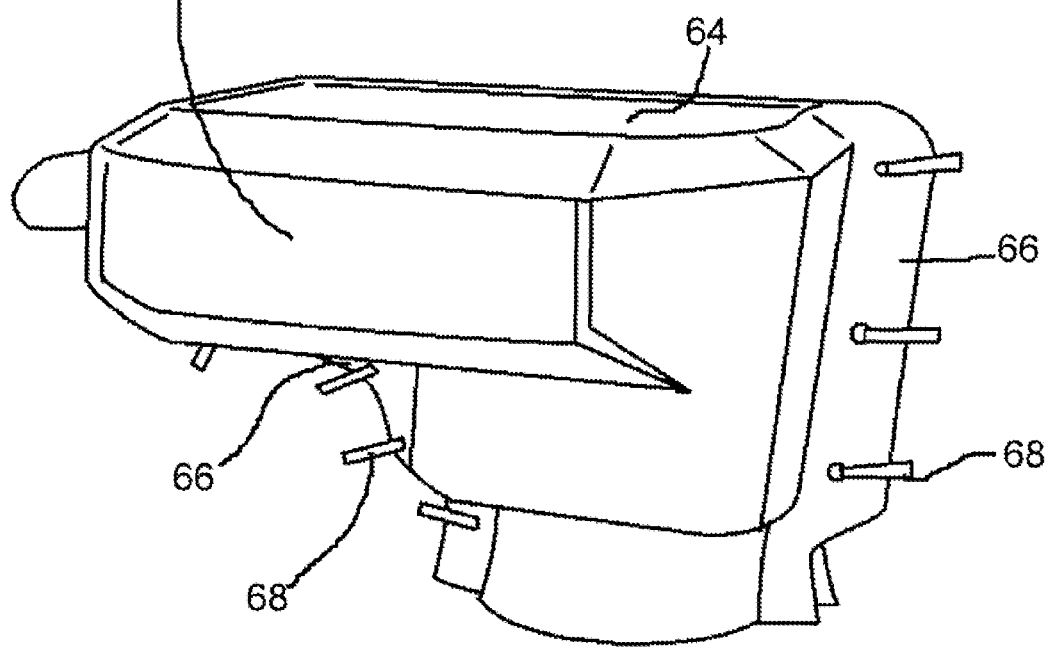
Figure 7:
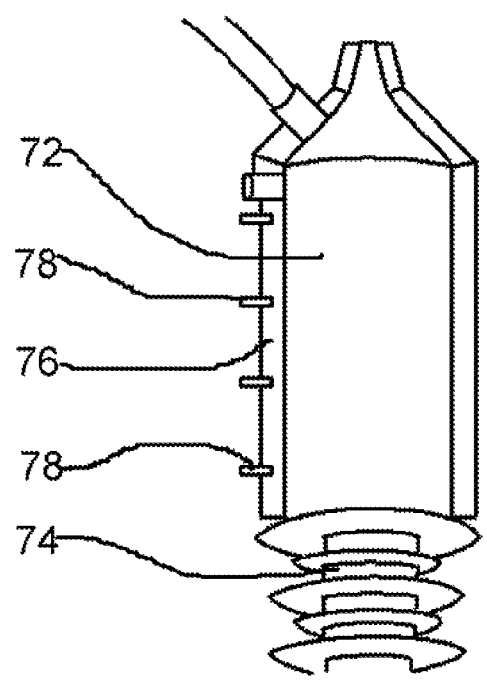
Figure 8:
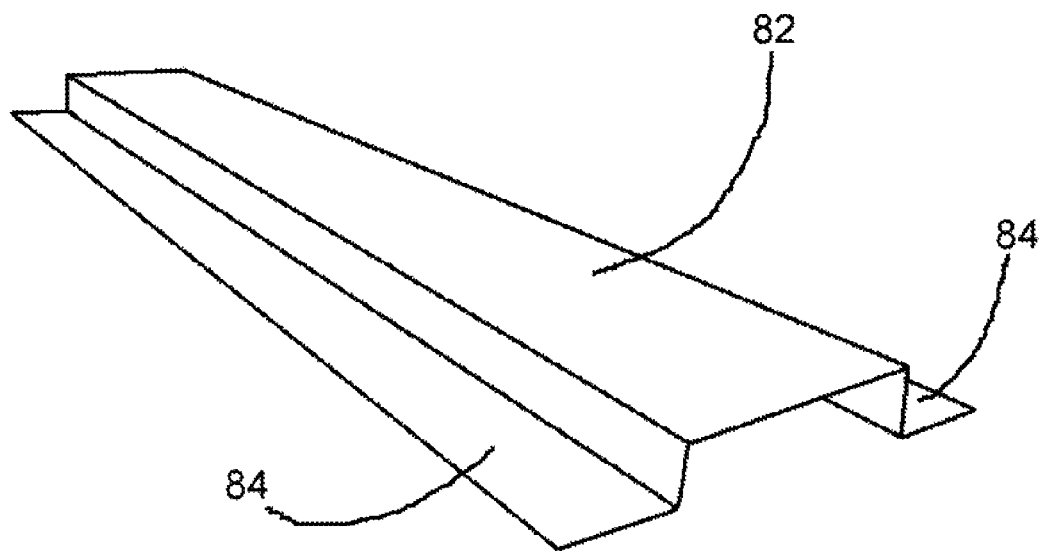
Figure 9:
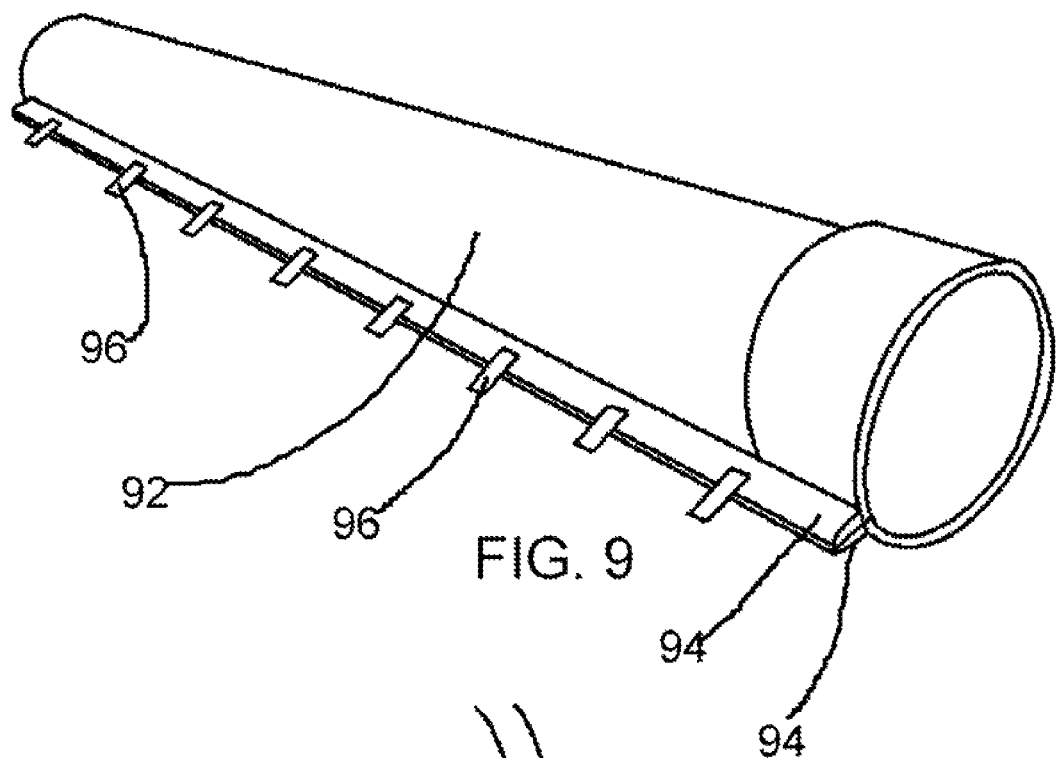
Figure 10:
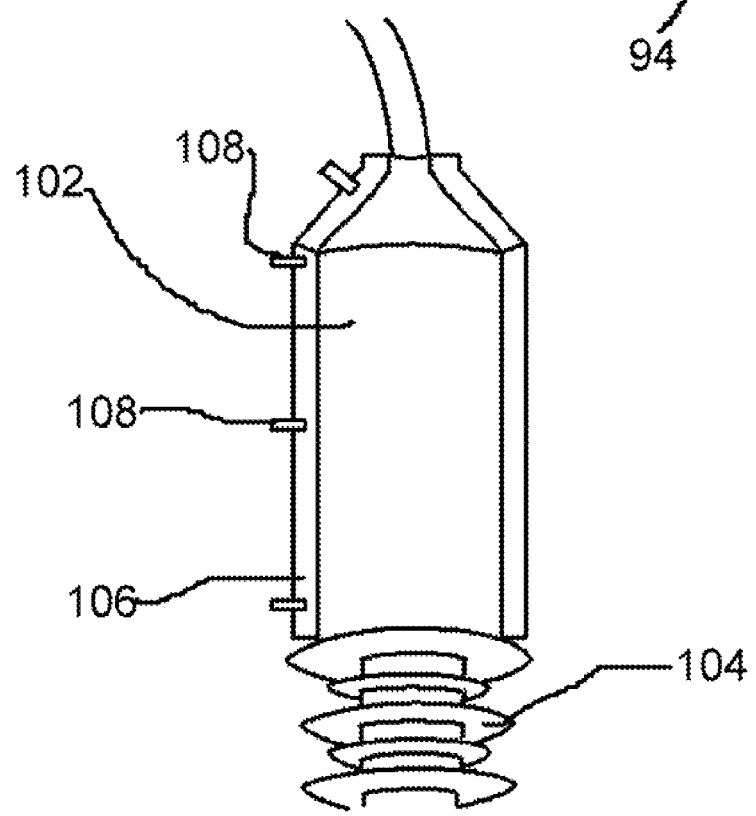

FIGS. 5-11 illustrate various covers. In FIG. 5, a cover 52 for a drive arm secures around a drive arm by wrapping around it with the edges 54 of the cover 52 overlapping each other. In FIG. 6, a cover 62 is shown for a transformer bushing. In this instance, the cover 62 is made of one piece with the top 64 unbroken, while the sides are continuations of the top that are split at opposed ends 66 and are tied together with ties 68. In FIG. 7, a cover 72 is shown for a breaker bushing 74. The cover 72 is made as one piece with peripheral edges 76 that are joined together with ties 78 to secure the cover 72 on the bushing 74. In FIG. 8, a cover 82 for a channel has edges 84 that may be secured to a component by adhesive. In FIG. 9, a cover 92 for a pipe bus is shown with peripheral edges 94 that are joined together with ties (not shown) to secure the cover 92 on the pipe bus. In FIG. 10, a cover 102 for is shown for a bushing 104 for a distribution transformer. The cover 102 is made as one piece with peripheral edges 106 that are joined together with ties 108 to secure the cover 102 on the bushing 104.

Figure 11:
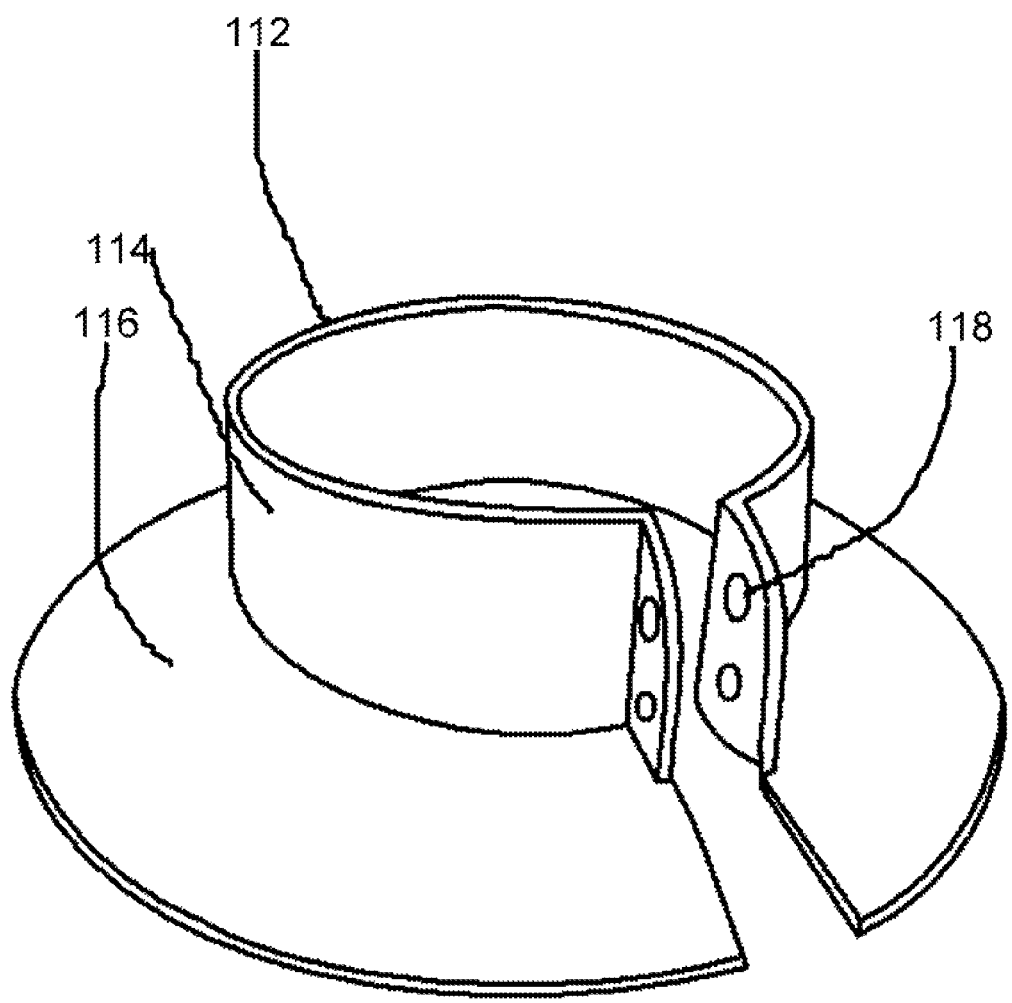

In FIG. 11, a general teacup form of cover 112 is shown. The teacup form of cover 112 is formed of a tubular portion 114, which is designed to wrap around a component, and a flange 116 that extends radially outward from the tubular portion 114. The cover 112 is split and provided with flanges 118 at the split to allow the cover 112 to be secure on an electrical component as for example with ties. The cover 112 may be used in a variety of situations even though the flange 116 does not fit exactly on the component, since birds do not like to perch in enclosed spaces. The tubular portion 114 wraps around an arm of the component, while the flange 116 extends in close proximity to the component.

Immaterial modifications to the disclosed method and apparatus may be made by those skilled in the art without departing from what is claimed.

What is claimed is:

1. A protector for a component of an electrical power transmission system, the protector comprising:
   a dielectric cover spray molded to fit around the component by spraying a mixed two part resin composition in multiple layers onto a mold using an applicator, the two part resin composition being formed from resin components that react and begin setting upon exit from the applicator and set sufficiently upon impact with the mold to allow a continuous build up of coating thickness during spray molding of the dielectric cover; and
   the dielectric cover having a peripheral edge including portions with surfaces that, in use, secure the dielectric cover on the component after removal of the dielectric cover from the mold.

2. The protector of claim 1 in which the surfaces cooperate together to secure the dielectric cover on the component.

3. The protector of claim 1 in which at least a portion of the dielectric cover is shaped to be gripped by a hot stick.

4. The protector of claim 1 in which the dielectric cover is provided with ventilation openings.

5. The protector of claim 1 in which the dielectric cover has a friction enhancing interior surface.

6. The protector of claim 5 in which the friction enhancing interior surface of the dielectric cover comprises a weak adhesive applied to an interior surface of the dielectric cover.

7. The protector of claim 1 in which the dielectric cover has a split tubular portion and a split flange extending radially outward from the split tubular portion.

8. The protector of claim 1 in which the two part resin composition is mixed within the applicator.

9. The protector of claim 1 in which a mold release compound has been applied to the mold prior to spray-molding.

10. The protector of claim 1 in which the dielectric cover comprises a tubular portion with an outwardly extending circumferential flange.

11. The protector of claim 10 in which the dielectric cover is split longitudinally at the peripheral edge.

12. A method of protecting a component of an electrical power transmission system from damage, the method comprising:
   placing a dielectric cover over the component, the dielectric cover having been spray molded to have a shape that fits around the component by spraying a mixed two part resin composition in multiple layers onto a mold using an applicator, the two part resin composition being formed from resin components that react and begin setting upon exit from the applicator and set sufficiently upon impact with the mold to allow a continuous build up of coating thickness during spray molding of the dielectric cover; and
   securing the dielectric cover on the component after removal of the dielectric cover from the mold.

13. The method of claim 12 in which securing the dielectric cover on the component comprises securing together cooperating surfaces of peripheral edges of the dielectric cover.

14. The method of claim 12 in which the dielectric cover is provided with ventilation openings.

15. The method of claim 12 in which the dielectric cover is loosely secured on the component with a friction enhancing interior surface.

16. The method of claim 15 in which the friction enhancing interior surface of the dielectric cover comprises a weak adhesive applied to an interior surface of the dielectric cover.

17. The method of claim 12 in which the two part resin composition is mixed within the applicator.

18. The method of claim 12 in which the dielectric cover is placed while the electrical power transmission system is in operation.

19. The method of claim 12 in which a mold release compound has been applied to the mold prior to spray-molding.

20. The method of claim 12 in which the mold has been created based on the dimensions of the component as obtained by three dimensional scanning.

21. A method of preparing a dielectric cover for protecting a component of an electrical power transmission system from damage, the method comprising:
   spray molding a mixed two part resin composition onto a mold to form a dielectric cover having a shape that fits around the component by spraying the mixed two part resin composition in multiple layers onto the mold using an applicator, the two part resin composition being formed from resin components that react and begin setting upon exit from the applicator and set sufficiently upon impact with the mold to allow a continuous build up of coating thickness during spray molding of the dielectric cover, the dielectric cover being adapted to be placed over and secured to the component after removal of the dielectric cover from the mold.

22. The method of claim 21 in which the mixed two part resin composition is allowed to cure between application of the multiple layers.

23. The method of claim 21 in which the two part resin composition is mixed within the applicator.

24. The method of claim 21 in which the two part resin composition comprises polyurethane.

25. The method of claim 21 further comprising preparing a mold of the component.

26. The method of claim 21 further comprising applying a mold release compound to the mold prior to spray molding.

27. The method of claim 21 further comprising, prior to spray molding:
   obtaining the dimensions of the component by three dimensional scanning; and
   creating the mold based on the obtained dimensions of the component.

* * * * *